(12) United States Patent
Wu et al.

(10) Patent No.: US 8,655,066 B2
(45) Date of Patent: Feb. 18, 2014

(54) COLOR CONSTANCY METHOD AND SYSTEM

(75) Inventors: Ren Wu, San Jose, CA (US); Yu-Wei Wang, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 267 days.

(21) Appl. No.: 13/061,235

(22) PCT Filed: Aug. 30, 2008

(86) PCT No.: PCT/US2008/074945
§ 371 (c)(1),
(2), (4) Date: Feb. 28, 2011

(87) PCT Pub. No.: WO2010/024824
PCT Pub. Date: Mar. 4, 2010

(65) Prior Publication Data
US 2011/0158527 A1    Jun. 30, 2011

(51) Int. Cl.
*G06K 9/00* (2006.01)

(52) U.S. Cl.
USPC .......................................... 382/167; 382/162

(58) Field of Classification Search
None
See application file for complete search history.

(56) References Cited

U.S. PATENT DOCUMENTS

| | | | |
|---|---|---|---|
| 5,544,258 A | 8/1996 | Levien | |
| 6,038,339 A | 3/2000 | Hubel et al. | |
| 6,038,340 A * | 3/2000 | Ancin et al. | 382/167 |
| 6,931,152 B2 | 8/2005 | Spitzer | |
| 7,200,264 B2 | 4/2007 | Hubel et al. | |
| 8,212,890 B2 * | 7/2012 | Nomura | 348/225.1 |
| 2003/0016865 A1 | 1/2003 | Lopez et al. | |
| 2004/0183923 A1 * | 9/2004 | Dalrymple | 348/224.1 |
| 2007/0047803 A1 * | 3/2007 | Nikkanen | 382/162 |
| 2011/0158527 A1 * | 6/2011 | Wu et al. | 382/167 |

FOREIGN PATENT DOCUMENTS

JP         07-066986        1/2003

OTHER PUBLICATIONS

Bianco et al "Consensus Based Framework for Illuminant Chromaticity Estimateion" Journal of Electronic Imaging May 14, 2008.*
Finlayson, et al., Color by Correlation: A Simple, Unifying Framework for Color Constancy, IEEE, vol. 23, No. 11, Nov. 2001, pp. 1209-1221.
A Comparison of Computational Colour Comstancy Algorithms—Part I: Methodology and Experiments With Synthesized Data, 2002.
A Comparison of Computational Colour Comstancy Algorithms—Part II: Experiments With Image Data, 2002.
Colour Constancy Using Image Regions, 2007.
Colour Constancy using Natural Image Statistics, 2007.
Edge-Based Colour Constancy, 2007.
Color Constancy Using Image Regions, A. Gijsenji and Th. Gevers, 2007.
Color Constancy using Natural Image Statistics, Arian Gijsenij and Theo Gevers, 2007.

* cited by examiner

*Primary Examiner* — Sean Motsinger

(57) ABSTRACT

A color constancy method and system include dividing an image into a plurality of sub-images and applying a plurality of color constancy algorithms to each of the sub-images. The outputs of each of the color constancy algorithms are analyzed for each of the sub-images to determine which of the color constancy algorithms give inconsistent results across the sub-images. The influence of the outputs of the algorithms providing inconsistent results is adjusted to decrease their influence (e.g. effect or weight) with respect to the outputs of algorithms providing consistent results. The outputs from the plurality of color constancy algorithms are combined based upon the adjustment of the outputs.

9 Claims, 3 Drawing Sheets

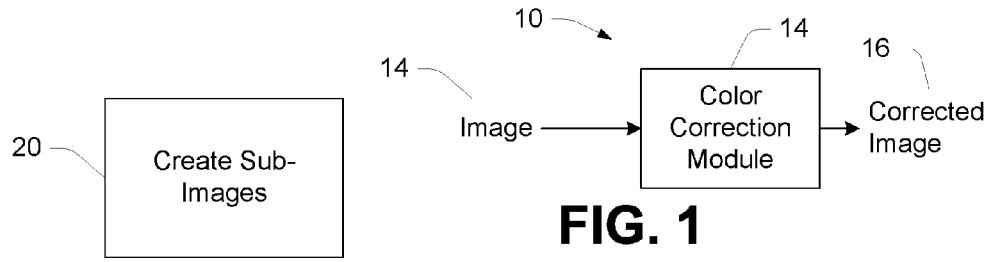
FIG. 1
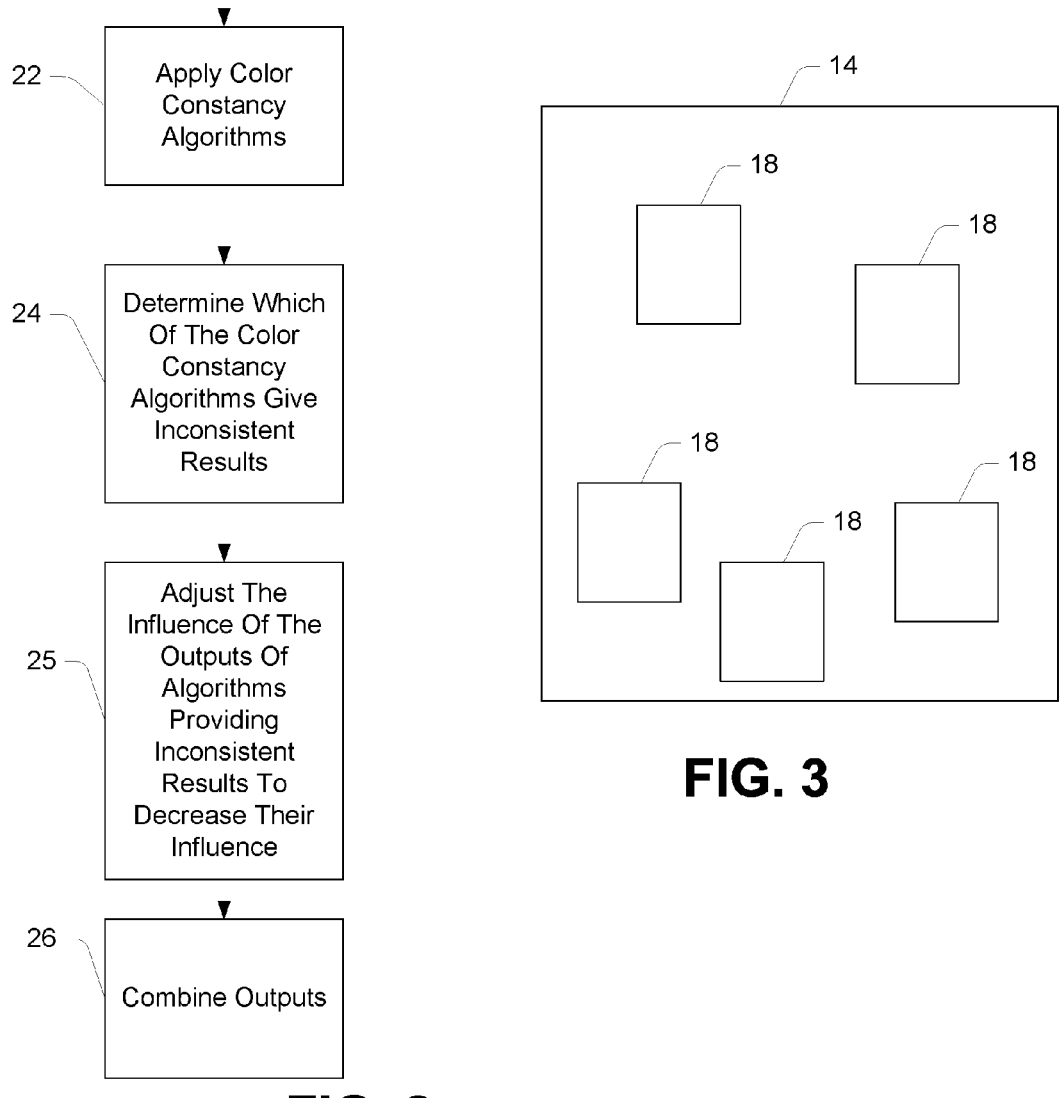
FIG. 2
FIG. 3

COLOR CONSTANCY METHOD AND SYSTEM

BACKGROUND

Under a large variety of scene illuminants, a human observer sees the same range of colors; a white piece of paper remains resolutely white independent of the color of light under which it is viewed. In contrast, color imaging systems, such as digital cameras, are less color constant.

The color constancy problem—determining the color of the light that illuminates a scene and correcting an image to account for its effect—is problematic for many imaging applications. In particular, digital cameras rely on color constancy algorithms to detect illuminants and generate final images. The performance of these color constancy algorithms has a direct impact to the overall image quality of the camera, and the human eye is sensitive to such imperfections.

Effectiveness of known color constancy algorithms varies. None of the known algorithms gives perfect results, and no one algorithm dominates the others in terms of accuracy. The performance of these algorithms, however, impacts the overall image quality of the camera.

For these and other reasons there is a need for the present invention.

SUMMARY

Embodiments of a color constancy method and system are disclosed. The method can be stored in a storage medium in the form of instructions that when executed perform the disclosed method, which includes dividing an image into a plurality of sub-images and applying a plurality of color constancy algorithms to each of the sub-images. In general, color constancy algorithms analyze and adjust the digital values in the image data to correct for differences in the characteristics of the light source used to illuminate the image. The outputs of each of the color constancy algorithms are analyzed for each of the sub-images to determine which of the color constancy algorithms give inconsistent results across the sub-images. The influence of the outputs of the algorithms providing inconsistent results is adjusted to decrease their influence (e.g. effect or weight) with respect to the outputs of algorithms providing consistent results. The outputs from the plurality of color constancy algorithms are combined based upon the adjustment of the outputs.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 3 illustrates an example of an image and sub-images in accordance with one or more embodiments of the present invention.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figures 1, 7A:
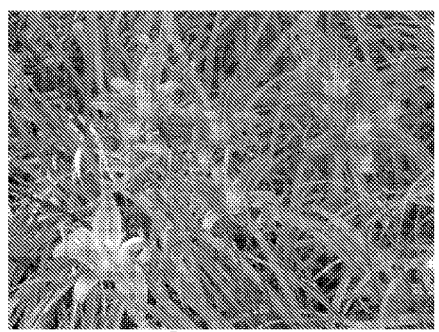
FIG. 1 is a block diagram conceptually illustrating an embodiment of an image processing system in accordance with one or more embodiments of the present invention.
FIGS. 7A and 7B illustrate images resulting from a prior art color constancy process and a process in accordance with one or more embodiments of the present invention, respectively.

FIG. 1 is a block diagram conceptually illustrating an embodiment of an image processing system 10 that includes a color correction module 12. The system 10 receives an image 14 and the color correction module 12 outputs a corrected image 16 with the corrected colors. Among other things, the color correction module 12 applies various color constancy algorithms to the received image 14, resulting in the corrected image 16.

Figures 1, 7B:
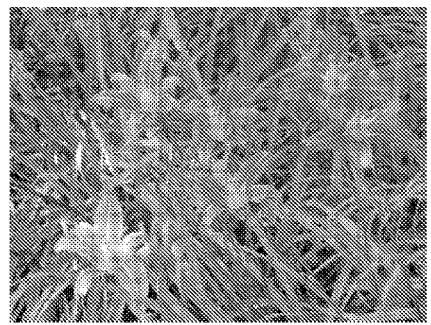
Figures 2, 7A:
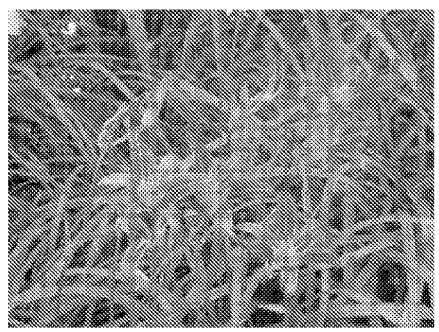
FIG. 2 is a flow diagram illustrating a color constancy method in accordance with one or more embodiments of the present invention.
Figures 2, 7B:
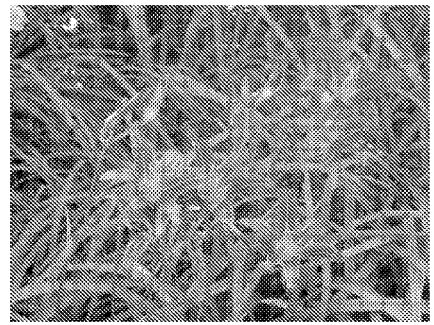

FIG. 2 is a flow diagram generally illustrating a method executed by the color correction module 12. In block 20, the image 14 is divided into a plurality of sub-images. The process of dividing the image 14 into sub-images 18 is analogous to capturing a photo in a given scene using a wide-angle lens, and then taking more close-up photos of portions of the same scene using a telephoto lens. Assuming that the wide-angle and close-up pictures can be taken very quickly so that the scene illuminant does not change in the interim, a color constancy algorithm applied to the wide-angle and close-up pictures should provide similar results across this set of photos. In a digital camera, instead of switching lens or zooming, one can simply use crops from within the same photo. The image 14 is cropped several times to provide images of several portions of the over-all image 14.

FIG. 3 conceptually illustrates the subdividing process, where the image 14 is divided into several sub-images 18. In general, the size of the sub-image 18 needs to be large enough to provide sufficient color information for a color constancy analysis. With the raw pixel counts of a typical image captured by a digital camera, for example, a relatively small sub-image will carry sufficient data. In example implementations, 16 sub-images 18 are analyzed. A typical digital camera has about 10 mega pixels, so using 16 sub-images results in about 625K pixels per sub-image. Even smaller sub-images (such as 20-50K pixels) are believed to provide sufficient data. The number of sub-images can vary, for example, from four to 64 sub-images in various embodiments.

In block 22, different color constancy algorithms are applied to the image 14 and the sub-images 18. The various color constancy algorithms applied in block 22 can include, for example, a process known as color by correlation, BV Qualification, gray world, Max RGB, Gray Finding etc. In general, color constancy algorithms determine illumination and adjust the digital values in the image data to correct for differences in the characteristics of the light source used to illuminate the image.

For instance, the gray world color constancy algorithm assumes that the means of each of the red, green and blue channels over an entire image form a fixed ratio under the canonical illuminant. Since the fixed ratio is not typically known, it is assumed that the fixed ratio represents a gray color. Thus, the gray world algorithm typically corrects the average of the image to gray. See, E. H. Land, "Recent Advances in Retinex Theory", Vision Research, 26, p. 7-21, (1986); G. Buchsbaum, "A Spatial Processor Model for Object Color Perception", Journal of the Franklin Institute 310, p. 1-26 (1980); and, R. Gershon, A. D. Jepson and J. K. Tsotsos, "From [R,G,B] to Surface Reflectance: Computing Color Constant Descriptors in Images", Perception, p. 755-758 (1988).

The Max RBG algorithm is based on the proposition that maximum pixel responses, calculated in the red, green, and blue color channels individually, can also be used as a white-point estimate (we refer to this method as Max.RGB). See, E. H. Land, "The Retinex Theory of Color Vision," Scientific American, p. 108-129, (1977).

In the color by correlation algorithm, a "correlation matrix memory" or "associative matrix memory" is used along with Bayesian or other correlation statistics. A correlation matrix memory is built to correlate the data from an image to reference images under a range of illuminants. When a digital camera, for example, produces an image, the data is converted to chromaticity and a vector is created corresponding to the values existing in the scene. This vector is multiplied by each column in the correlation matrix giving a new matrix. Each column is then summed, and the resulting values form a vector that represents the likelihood of each reference source being the illuminant of the scene. The vector values can be density plotted where each value is plotted at the chromaticity of the illumination for that particular column. From this plot normal statistical methods can be used to estimate the likely illumination of the scene. See, G. Finlayson et al, "Color by Correlation: A Simple, Unifying Framework for Color Constancy," IEEE Transactions on Pattern Analysis and Machine Intelligence, Vol. 23, No. 11, pp. 1209-1221, (2001) and U.S. Pat. No. 6,038,339 to Hubel et al.

If the output of a specific algorithm varies among the image 14 and/or sub-images 18, that specific algorithm is probably not well suited for the image 14. In general, a color constancy algorithm that is suited for a particular image would be expected to provide consistent results between the image 14 and sub-images 18. Similarly, the outputs provided by several different algorithms would be expected to be similar—if the output of one algorithm varies significantly from the others, it is probably not well suited for that particular image.

Hence, in block 24, it is determined which of the color constancy algorithms give inconsistent results across the sub-images. For example, the analysis of the outputs can include looking at variation of outputs of a given one of the algorithms across the sub-images 18 and entire image 14, and/or variation of outputs among the various color constancy algorithms.

In block 25, the influence of the outputs of the algorithms providing inconsistent results is adjusted to decrease their influence (e.g. effect or weight) with respect to the outputs of algorithms providing consistent results. For example, an influence factor such as a weight is applied to the outputs of the algorithms providing inconsistent results to decrease their influence (e.g. effect or weight) than the outputs of algorithms providing consistent results.

In some embodiments, a model is constructed to combine the outputs of the various color constancy algorithms, and based on the determination, parameters of the model are varied to adjust the influence. Thus, combining the outputs of the color constancy algorithms can be a simple weighting of the outputs, or the parameters can be varied in more complex manners.

In example embodiments, each color constancy algorithm processes each sub-image as if it were an entire stand-alone image. Results are calculated and analyzed, including for example mean and variance across the sub-image set, which can be noted as F. The final result can be calculated by a known function $f(W, F)$, where W is a set of parameters.

In certain embodiments, the value of W is set based on experience. For example, the influence of one algorithm is reduced if the algorithm has a higher variance than others. In some embodiments, optimal values for W are determined in real-time, using machine learning and optimization technologies. Given a labeled dataset, these technologies allow determining the value of W so that the final results will have minimal errors for this dataset. If the dataset is reasonable in size and its contents, the system will yield better overall performance.

In one embodiment, R is the final output after weighting the results of all of the algorithms. This is also the color temperature. R is determined as follows:

$$R=\Sigma(W_i \cdot K_i)/\Sigma W_i$$

where $$W_i=(C-V_i') \cdot W_i^v$$

$V_i$ is the normalized variance of color temperature across the set of sub-images 18 from the same image 14 by color constancy algorithm i.

$V_i'=Vi/\text{mean}(Vij)$, where $\text{mean}(Vij)$ is the mean of the normalized variance for algorithm i across an entire training set of images.

$K_i$ is the color temperature for the whole image 14 by algorithm i.

For the $j^{th}$ photo in the set of sub-images, $R_j'$ is the true color temperature measured at the scene. Thus, the error is defined as $$E_j=abs(R_j-R_j')/R_j'$$

and the total error for entire set of sub-images is $$E = \sum_j E_j$$

C and $W_i^v$ are free parameters predetermined offline with a training set with the objective to minimize the total errors E.

The combined outputs of the color constancy algorithms can then be used to adjust the colors of the image 14 and generate the final image 16.

Embodiments of the image processing system 10 may be implemented by one or more discrete modules (or data processing components) that are not limited to any particular hardware, firmware, or software configuration. In the illustrated embodiments, the modules may be implemented in any computing or data processing environment, including in digital electronic circuitry (for example, an application-specific integrated circuit, a digital signal processor (DSP), etc.) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (for example, machine-readable code, such as computer software) for implementing the methods that are executed by the embodiments of the image processing system 10, as well as the data it generates, are stored in one or more computer-readable storage media. Storage media suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the image processing system 10 may be implemented in any one of a wide variety of electronic devices, including desktop and workstation computers, video recording devices and digital camera devices. Some embodiments of the image processing system 10 may be implemented with relatively small and inexpensive components that have modest processing power and modest memory capacity. As a result, these embodiments are highly suitable for incorporation in compact camera environments that have significant size, processing, and memory constraints, including but not limited to handheld electronic devices (a mobile telephone, a miniature still image or video camera, etc.), pc cameras, and other embedded environments.

Figure 4:
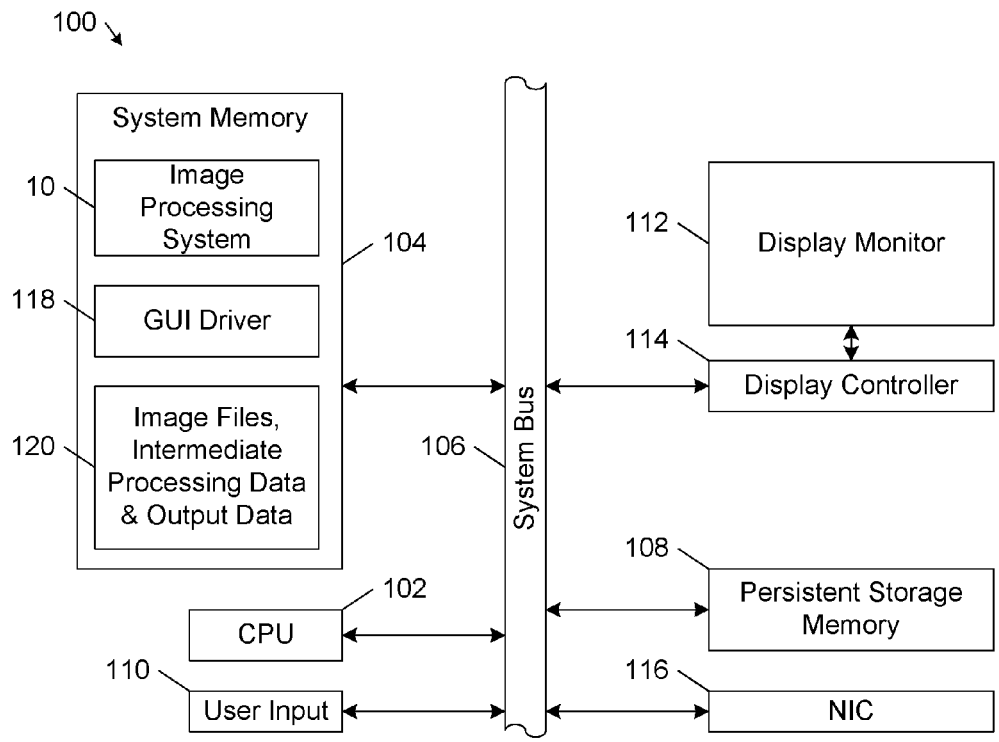
FIG. 4 is a block diagram illustrating an embodiment of a computer system incorporating an embodiment of the image processing system illustrated in FIG. 1.

FIG. 4 illustrates an embodiment of a computer system 100 that incorporates any of the embodiments of the image processing system 10 described herein. The computer system 100 includes a processing unit 102 (CPU), a system memory 104, and a system bus 106 that couples processing unit 102 to the various components of the computer system 100. The processing unit 102 typically includes one or more processors, each of which may be in the form of any one of various commercially available processors. The system memory 104 typically includes a read only memory (ROM) that stores a basic input/output system (BIOS) that contains start-up routines for the computer system 160 and a random access memory (RAM). The system bus 106 may be a memory bus, a peripheral bus or a local bus, and may be compatible with any of a variety of bus protocols, including PCI, VESA, Microchannel, ISA, and EISA. The computer system 100 also includes a persistent storage memory 108 (a hard drive, a floppy drive, a CD ROM drive, magnetic tape drives, flash memory devices, digital video disks, etc.) that is connected to the system bus 106 and contains one or more computer-readable media disks that provide non-volatile or persistent storage for data, data structures and computer-executable instructions.

A user may interact (for example, enter commands or data) with the computer 100 using one or more input devices 110 (a keyboard, a computer mouse, a microphone, joystick, touch pad, etc.). Information may be presented through a graphical user interface (GUI) that is displayed to the user on a display monitor 112, which is controlled by a display controller 114. The computer system 100 also typically includes peripheral output devices, such as speakers and a printer. One or more remote computers may be connected to the computer system 100 through a network interface card (NIC) 116.

As shown in FIG. 4, the system memory 104 also stores the image processing system 10, a GUI driver 118, and a database 120 containing image files corresponding to the image 14 and the color corrected image 16, intermediate processing data, and output data. In some embodiments, the image processing system 10 interfaces with the GUI driver 118 and the user input 110 to control the creation of the enhanced image 16. In some embodiments, the computer system 100 additionally includes a graphics application program that is configured to render image data on the display monitor 112 and to perform various image processing operations on the images 14.

Figure 5:
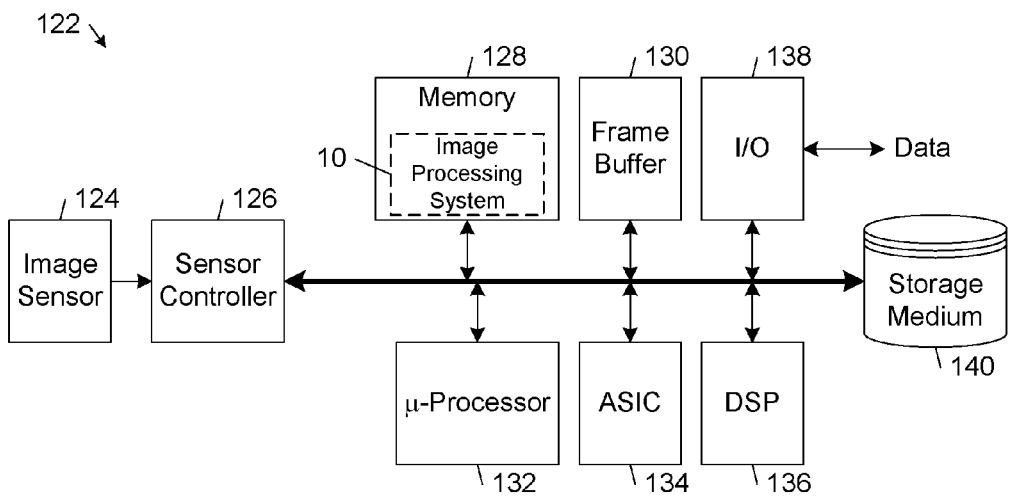
FIG. 5 is a block diagram illustrating an embodiment of a camera system incorporating an embodiment of the image processing system illustrated in FIG. 1.

FIG. 5 illustrates an embodiment of a digital camera system 122 that incorporates any of the embodiments of the image processing system 10 described herein. The digital camera system 122 may be configured to capture one or both of still images and video image frames. The digital camera system 122 includes an image sensor 124 (for example, a charge coupled device (CCD) or a complementary metal-oxide-semiconductor (CMOS) image sensor), a sensor controller 126, a memory 128, a frame buffer 130, a microprocessor 132, an ASIC (application-specific integrated circuit) 134, a DSP (digital signal processor) 136, an I/O (input/output) adapter 138, and a storage medium 140. In general, the image processing system 10 may be implemented by one or more of hardware and firmware components. In the illustrated embodiment, the image processing system 10 is implemented in firmware, which is loaded into the memory 128. The storage medium 140 may be implemented by any type of image storage technology, including a compact flash memory card and a digital video tape cassette. The image data stored in the storage medium 140 may be transferred to a storage device (a hard disk drive, a floppy disk drive, a CD-ROM drive, a non-volatile data storage device, etc.) of an external processing system (for example, a computer or workstation) via the I/O subsystem 138.

The microprocessor 132 controls the operation of the digital camera system 122. In some embodiments, the microprocessor 132 is programmed with a mode of operation in which a respective classification record is computed for one or more of the captured images. In some embodiments, a respective enhanced image 16 is computed for one or more of the captured images based on their corresponding classification records.

Figure 6A:
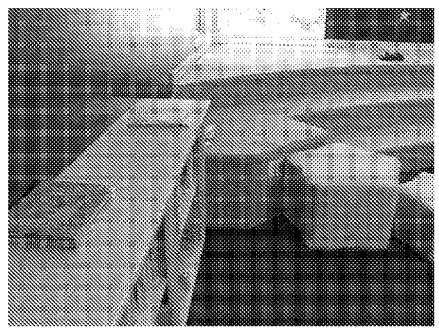
FIGS. 6A and 6B illustrate images resulting from a prior art color constancy process and a process in accordance with one or more embodiments of the present invention, respectively.
Figure 6B:
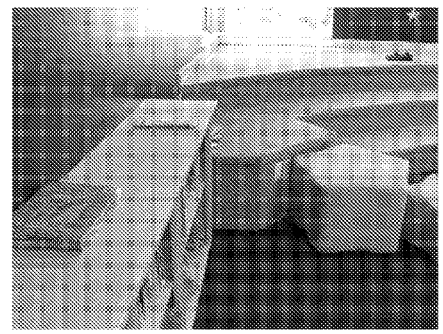

FIGS. 6A and 6B illustrate examples of images resulting from a prior art color constancy process and the process disclosed herein, respectively. In color versions of the photos, the image illustrated in FIG. 6A has a strong blue cast, which is corrected in the image illustrated in FIG. 6B. The image illustrated in FIGS. 6A and 6B is an example of a scene illuminated with mixed illuminants, which can cause problems for prior art color constancy algorithms alone.

FIGS. 7A and 7B illustrate examples of further images resulting from a prior art color constancy process and the process disclosed herein, respectively. The disclosed color constancy process is more robust, providing more consistent results between images of an object taken from varying angles, for example. In these images, the camera view of the scene varies slightly between the two images. With the prior art color constancy algorithms alone, the colors of the scene vary from the view shown in FIG. 7A-1 to the view shown in FIG. 7A-2. For instance, in FIG. 7A-1, some portions of the leaves have a blue tint but in FIG. 7A-2 the leaves are green. The colors of the flower petals also vary from FIG. 7A-1 to FIG. 7A-2. In the images illustrated in FIGS. 7B-1 and 7B-2, the colors stay more constant, or stable, as the view changes from one image to the other.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method, comprising: subdividing an image into a plurality of sub-images; applying a plurality of color constancy algorithms to each of the sub-images; determining which of the color constancy algorithms give inconsistent results between the sub-images; adjusting the influence of the outputs of the algorithms providing inconsistent results to decrease their influence with respect to the outputs of algorithms providing consistent results; and combining the outputs of the plurality of color constancy algorithms based upon the adjustment of the outputs.

2. The method of claim 1, wherein determining which of the color constancy algorithms give inconsistent results includes determining output variation among the plurality of color constancy algorithms.

3. The method of claim 1, wherein determining which of the color constancy algorithms give inconsistent results includes determining output variation among the sub-images.

4. The method of claim 1, wherein the plurality of color constancy algorithms are selected from the group including color by correlation, gray world, and Max RGB.

5. A computer readable storage medium storing instructions that when executed perform a method comprising: subdividing an image into a plurality of sub-images; applying a plurality of color constancy algorithms to each of the sub-images; determining which of the color constancy algorithms give inconsistent results between the sub-images; adjusting the influence of the outputs of the algorithms providing inconsistent results to decrease their influence with respect to the outputs of algorithms providing consistent results; and combining the outputs of the plurality of color constancy algorithms based upon the adjustment of the outputs.

6. The non-transitory computer readable storage medium of claim 5, wherein determining which of the color constancy algorithms give inconsistent results includes determining output variation among the plurality of color constancy algorithms.

7. The non-transitory computer readable storage medium of claim 5, wherein determining which of the color constancy algorithms give inconsistent results includes determining output variation among the sub-images.

8. A system, comprising:
a color correction module including a processor, wherein the color correction module is operable to subdivide an image into a plurality of sub-images; apply a plurality of color constancy algorithms to each of the sub-images; determine which of the color constancy algorithms give inconsistent results, wherein determining which of the color constancy algorithms give inconsistent results includes determining output variation among the sub-images; adjust the influence of the outputs of the algorithms providing inconsistent results to decrease their influence with respect to the outputs of algorithms providing consistent results; and combine the outputs of the plurality of color constancy algorithms including the adjusted outputs.

9. The system of claim 8, wherein determining which of the color constancy algorithms give inconsistent results includes determining output variation among the plurality of color constancy algorithms.

\* \* \* \* \*